(12) United States Patent
Alvestad et al.

(10) Patent No.: US 12,727,586 B2
(45) Date of Patent: Sep. 8, 2026

(54) HATCHING SYSTEM

(71) Applicant: ALVESTAD AS, Oslo (NO)

(72) Inventors: Runar Alvestad, Oslo (NO); Morten Ertsaas, Rælingen (NO)

(73) Assignee: ALVESTAD AS, Oslo (NO)

( * ) Notice: Subject to any disclaimer, the term of this patent is extended or adjusted under 35 U.S.C. 154(b) by 381 days.

(21) Appl. No.: 18/278,131

(22) PCT Filed: Feb. 22, 2022

(86) PCT No.: PCT/EP2022/054304
§ 371 (c)(1),
(2) Date: Aug. 21, 2023

(87) PCT Pub. No.: WO2022/175539
PCT Pub. Date: Aug. 25, 2022

(65) Prior Publication Data

US 2024/0130335 A1 Apr. 25, 2024
US 2024/0224954 A9 Jul. 11, 2024

(30) Foreign Application Priority Data

Feb. 22, 2021 (NO) .................................... 20210229

(51) Int. Cl.
*A01K 61/17* (2017.01)
*A01K 61/95* (2017.01)

(52) U.S. Cl.
CPC .............. *A01K 61/17* (2017.01); *A01K 61/95* (2017.01)

(58) Field of Classification Search
None
See application file for complete search history.

(56) References Cited

FOREIGN PATENT DOCUMENTS

CN 108834962 A * 11/2018 ............. A01K 61/17

OTHER PUBLICATIONS

Machine Translation of CN-108834962-A, date Nov. 20, 2018, Yuan, Xiao-hui (Year: 2018).*

* cited by examiner

*Primary Examiner* — Dov Popovici
(74) *Attorney, Agent, or Firm* — Amster, Rothstein & Ebenstein LLP

(57) ABSTRACT

A system for detecting and retrieving selected specimens from a water containing hatching tray. The system includes retrieving unit including a tube having a width comparable to the size of the specimens to be retrieved, the tube end being configured to be positioned in the water, and a pump device that pumps water and specimens from the tray. It also includes a robot unit moving the retrieving unit in a predetermined path related to a first reference system over the tray. The system also includes an imaging device to detect and select specimens having chosen characteristics, and a control unit defining a second reference system defined by the position of a selected specimen relative to the position of the retrieving unit, the system being configured to move the tube end to the position of the selected specimen and pumping the specimen into the tube.

10 Claims, 1 Drawing Sheet

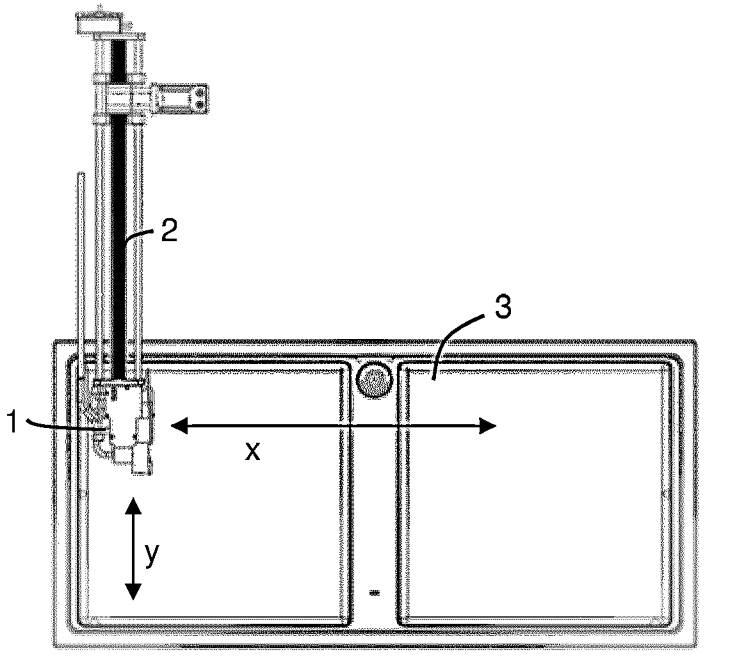
Fig. 1
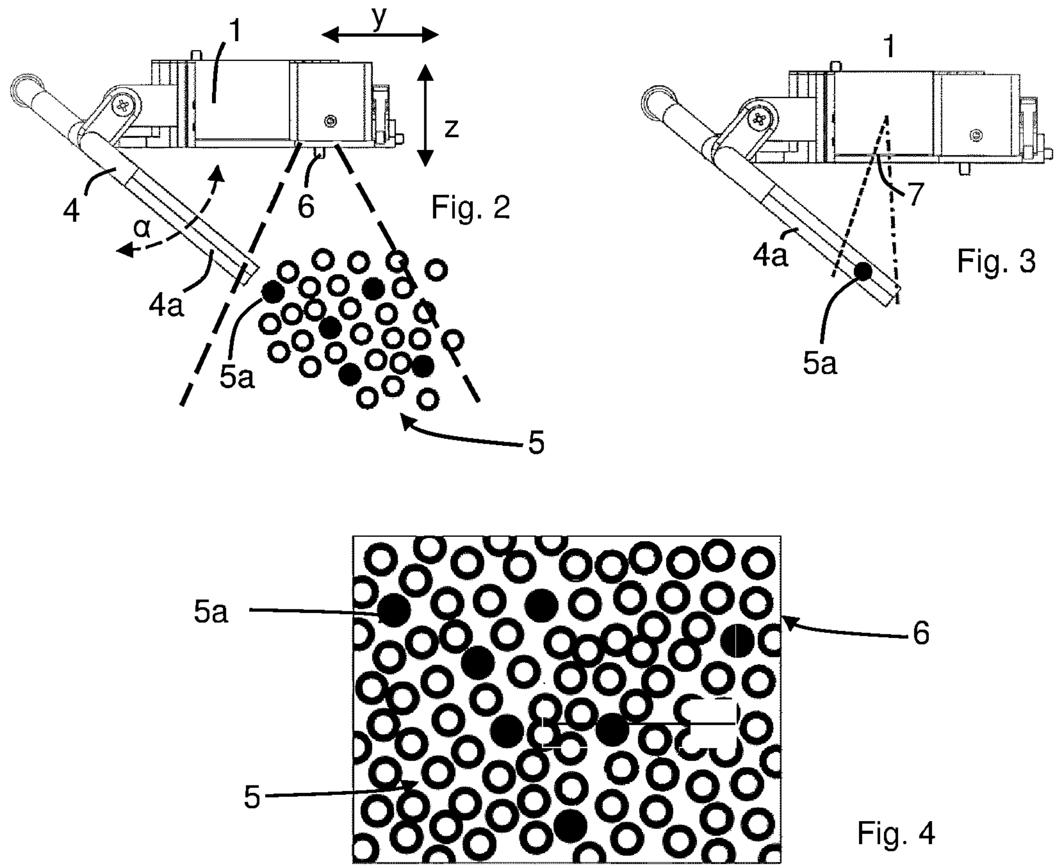
Fig. 2
Fig. 3
Fig. 4

HATCHING SYSTEM

The present invention is related to a hatching system for fish roe and similar.

The present intensive production in fish farming increases the need for an improved capacity in the hatching systems with improved water quality and enhanced control with the hatching areas during production.

Production of roe, hatching and incubation of fry is the first step in the fish farming production process. Good technology in this field forms part of the growing potential of the fish which is hard to regain later in the growing phase. Therefore, it is important to improve the technology in the hatcheries, to improve both the fish health and the growth potential in the industry.

Modern hatching systems have been improved substantially in recent years and automation has also been employed in order to increase the efficiency. One example if this is discussed in the theses by Yngve Brathaug, Per Espen Aarseth, Kristoffer Hildrestrand and Kristan André Lilleindset, "RoeBot, the roe picking robot", Bachelor thesis 2018, Department of Mechanical and Industrial Engineering, Norwegian University of Science and Technology, Automation Engineering. In the thesis different robot systems are described being capable of moving among hatching racks including one or more hatching trays, recognizing, and removing dead or otherwise unwanted roe (egg) or fry. The thesis describes several different alternative movements of the robot over a tray, the use of machine vision to locate the egg or fry and a vacuum tube to be located above the selected egg and suck it out from its position. In reality the eggs may be placed in a tray with features simulating sea grass etc, as described in WO2006/130020, making the positioning complex and increasing the chance of hurting or ruining healthy eggs of fry. Other examples of the prior art are shown in CN108834962, describing a system for selecting eggs relative to one reference system, and CN109255816, describing the how the eggs are selected.

It is an object of the present invention to provide a controlled system efficiently using robots for removing unwanted eggs or fry from the trays. This is obtained as specified in the accompanying claims.

The present invention thus relates to a system and a method utilizing a robot for inspecting and retrieving unhealthy or dead eggs or fry from hatching trays, where a vacuum tube unit is maneuvered above the tray, the vacuum tube unit including a camera for inspecting the eggs or fry in the hatching tray and locating and retrieving the selected eggs or fry. The analysis and recognition of the eggs and fry to be removed is based on image analysis, for example as discussed in the thesis referred to above, the method thereof being incorporated here by way of reference.

The robot thus moves the tube unit over the tray in a predetermined pattern, such as in a linear pattern back and forth until the tray has been covered. As the cited thesis other patterns of movements may also be contemplated, the chosen pattern may be referred to as a global positioning sequence referring to the global reference system, e.g. defined by the node point of the linear actuators in relation to the physical dimensions of the complete hatching rack system (thus including more than one hatching rack).

At the detection of an unhealthy egg or fry in a position, the global reference system which may include a number of hatching racks and trays and a local, tray-based reference system, e.g., calibrated with reference to the tray corners, the method according to the present invention, using the camera, locates the unhealthy specimen within the frame registered in the position. According to the present invention the robot then moves the tube to the local position within the frame, homing in on the specimen, before lowering the tube and retrieving the specimen from the relative position within the picture frame. This way the movement according to the tray-based (local) reference system may be fast, depending on the area inspected by the camera in each position, and the fine movements when retrieving a specimen from a position in a picture frame is only performed when an unhealthy specimen has been found. This type of movement within a picture frame is referred to as "relative movement".

The invention is thus based on the use of two or more reference systems, first for moving to the area from where the eggs or fry should be retrieved, and then the fine movements for selecting each individual egg or fry. This process has the advantage over the prior art of reducing inaccuracies in the movement in the first or global reference system by adjusting the second movement to the new, image based, reference system. If the robot moves a little too long the eggs or fry are shifted relative to the image and thus the robot will compensate for the inaccuracy and still be able to retrieve the egg or fry.

More specifically the present invention will be described with reference to the accompanying drawings, illustrating the invention by way of examples—

FIG. 1 illustrates the robotic system moving over a tray.

FIG. 2 illustrates the retrieving unit.

FIG. 3 illustrates the retrieving unit having retrieved a selected specimen.

FIG. 4 illustrates schematically an image of a number of fry or eggs.

Thus, the present invention relates to an automatic hatching system for removing dead or defect eggs or fry from a hatching tray. FIG. 1 illustrates the movements of a retrieving unit 1 controlled by a robot system over a tray 3. As is discussed in the thesis discussed above the robot may use a number of different patterns of movement while a Cartesian system is indicated in the drawing moving the retriever unit relative to the x and y axis. The pattern of movement may be chosen according to the available equipment and situation as long as most of the trays containing eggs or fry. For securing the operation the robot may be calibrated according to reference points in the tray, such as recognizing corners or other similar features.

The system achieves this in the drawings by using robot arms using several coordinates or reference systems during the different operations for positioning the unit above the target, consisting of dead or defect eggs, roe and/or fry.

More specifically referring to a preferred embodiment of the invention, first a global reference system which may be calibrated using a homing sequence, which is a well-known system featured included in the associated stepper motors in the driver cards and serves as a global reference for a whole system (not illustrated) which may include several trays. In this embodiment we thus may have three reference systems.

Second a calibration relative to a local reference system being calibrated e.g. by making contact, visually or mechanically, with two corners of the hatching tray as well as possibly a vertical calibration relative to the bottom of a tray above the tray that is about to be examined.

As illustrated in FIG. 2 the retriever unit then is positioned at preprogrammed measuring points given by the local reference system. The retrieving unit 1 is equipped with a camera 6 providing an image of a group of specimens such as eggs or fry 5 in the position, and the system, as discussed in the abovementioned thesis, is configured to recognize unhealthy specimens in the group 5. The selected specimen in identified by the position in the reference system defined by the image, thus the position in the image frame. The image analysis may be performed in the retriever unit 1 or be communicated to a central processing unit or control unit (not shown) controlling the movements relative to the different reference systems. It is also possible to make additional images in order to adjust the positioning, e.g. if there have been additional movements in the robot position or in the tray.

The retriever unit is also equipped with a tube 4 with a tube end having an opening with a size comparable to the specimens for retrieving selected specimens from the group. From the sampled image a specimen 5*a* is selected and the retriever unit is moved relative to the identified position in the image frame, for fine tuning of the position needed to retrieve the specific specimen. The movement relative to the image frame may be performed by moving the retriever unit in the horizontal x or y directions or possibly in the z direction positioning the tube end 4*a* over the selected specimen and using vacuum to pump the specimen into the tube 4.

In addition, the tube 4 may also be capable of moving relative to the retriever unit 1, e.g. by having a telescopic tube or adjusting the angle $\alpha$ of the tube so as to fine position the tube end. The retriever operation may also be monitored by the camera having a field of view covering the specimen 5*a* and the tube end 4*a*.

Additional imagining and analysis followed but correcting movements may follow in order to correct for calibration errors etc, or for changes in the water level of the tray. Stereoscopic imaging or analyzing images from two slightly different positioned may be used for identifying the depth in the z direction of the selected specimens.

The tube end 4*a* and/or retriever unit is then moved in the vertical, Z direction to the target specimen 5*a* and the vacuum process is activated withdrawing the specimen through the pipe, as illustrated in FIG. 3. According to a preferred embodiment of the invention the tube 4 may include a transparent pipe section, in the drawing illustrated in the tube end 4*a*. As the specimen is drawn through the transparent pipe and additional control image may be taken and analyzed e.g. by providing an image of the specimen 5*a* with a separate camera or sensor 7 or moving the specimen in front of the first camera 6. Other analysis not including a camera such as optical sensors may also be employed, If the specimen, roe (egg) or fry, is validated as dead or defect it is discarded by suction/under pressure through the pipeline and into a container. If it turns out that the specimen is healthy, e.g. the wrong egg got caught by the vacuum tube, the egg is put back into the tray by generating a slight over pressure in the pipeline, and the specimen put back into the tray.

The system may also have additional features such as reversing the vacuum thus using fluid to provide rotation or stirring in the area where the specimens 5 accumulate, e.g. when there are several layers. Thus, if no defect specimens are found, a small pulse of pressure may provide circulation so as to defect specimen from the lower layers are forced to the top layers. A new image may then be analyzed before moving the unit to the next position.

In addition, the vacuum unit may be used to remove biological waste material such as eggshells by rotating the tube and using under pressure/vacuum to remove the unwanted residue/objects.

In FIG. 4 an image frame 6 with a number of eggs, fry or similar, is illustrates, where one specimen 5*a* has been selected. As the position of the specimen relative to the image is known and the position of the camera, preferably in the retrieving unit, is known the image thus represents a local, second reference system and the tube end may be navigated to this position. As can be seen in the drawing other specimens having the same characteristics (black in the drawing) are also found and may either be retrieved based on the position in the existing image or a new image may be taken in case the withdrawing of the first specimen results in movements among the specimens. This process may be repeated until all the specimens having the selected characteristics have been removed from the frame 6.

To summarize the present invention relates to a system for detecting and retrieving selected specimens being at least one of fish eggs, roe or fry, from a water containing hatching tray. The system includes retrieving unit including a tube having a width comparable to the size of the specimens to be retrieved where the tube end is configured to be positioned in the water in the tray, and a pump device cable of pumping water and specimens from the tray. A robot unit is included being configured for moving the retrieving unit in a predetermined path related to a first reference system over said tray, the first reference system being in two or three dimensions. The system also includes an imaging device having a known position relative to the retrieving unit being configured to detect and select specimens having chosen characteristics, e.g. indicating if they are dead or unhealthy, the specimens being located in the image frame and relative to the retrieving unit.

The system also includes a control unit defining a second reference system defined by the position of a selected specimen relative to the position of the retrieving unit, defined as a position within the image frame. The control unit is also configured to move the tube end, either by moving the retrieving unit with the tube end and/or by moving the tube end relative to the retrieving unit to the position of the selected specimen and pumping the specimen into the tube.

The imaging unit includes a camera is mounted on the retrieving unit, the images being constituted by an image of the tray closest to the retrieving unit defining the second reference system. The imaging means may also include means to locate the specimens in a three-dimensional reference system, the system being configured to move the tube end in x, y, and z directions.

The tube may have a transparent section and the retrieving unit includes an analyzing device controlling predetermined characteristics of the retrieved specimen and the retrieving unit being configured to pump the specimen back into the tray if said characteristics does correspond to the predetermined set of characteristics.

The system may include a number of trays in predetermined positions relative to each other, the relative distances being mapped in a global reference system and the robot being configured to move between the trays so as to scan a number of trays in the system.

The invention claimed is:

1. System for detecting and retrieving selected specimens being at least one of fish eggs, roe or fry, from a water containing hatching tray, the system including retrieving unit including a tube having a width comparable to the size of the specimens to be retrieved, the tube end being configured to be position in the water, and a pump device capable of pumping water and specimens from said tray, and a robot unit moving the retrieving unit in a predetermined path related to a first reference system over said tray, the system also including an imaging device being configured to detect and select specimens having chosen characteristics and their positions relative to an image frame and relative to the retrieving device, and wherein the system includes a control unit defining a second reference system defined by the position of a selected specimen in the image frame, the control unit being configured to move the tube end to the position of the selected specimen and pumping the specimen into the tube.

2. System according to claim 1, wherein the imaging device includes a camera being mounted on the retrieving unit, the images being constituted by an image of the tray closest to the retrieving unit.

3. System according to claim 1, wherein the characteristics for selecting said specimens are indicative if they are dead or unhealthy.

4. System according to claim 1, wherein the tube has a transparent section and the retrieving unit includes an analyzing device controlling predetermined characteristics of the retrieved specimen and the retrieving unit being configured to pump the specimen back into the tray if said characteristics does correspond to the predetermined set of characteristics.

5. System according to claim 1, wherein the hatching tray includes a number of trays in predetermined positions that are distanced relative to each other, the relative distances being mapped in a global reference system and the robot being configured to move between the trays so as to scan a number of trays in the system.

6. System according to claim 1, wherein the second reference system is a three dimensional reference system, wherein the imaging device is configured to provide three dimensional images and the system is configured to move the tube end in three dimensions to the position of the selected specimen.

7. System according to claim 1, wherein the retrieving unit is configured to move the tube end by rotating the tube relative to the retrieving unit.

8. System according to claim 1, wherein the tube end is telescopically connected to the retrieving unit, so as to move the tube end relative to the retrieving unit.

9. System according to claim 1, wherein the retrieving unit is configured to move in the vertical direction relative to the robot.

10. System according to claim 1, wherein the movement of the retrieving unit relative to the imaged area is performed by said robot.

* * * * *